(12) United States Patent
Prejeant (10) Patent No.: US 9,260,141 B1
(45) Date of Patent: *Feb. 16, 2016

(54) SPARE TIRE CARRIER FOR TRUCK
(71) Applicant: Randy Prejeant, Harvey, LA (US)
(72) Inventor: Randy Prejeant, Harvey, LA (US)
( * ) Notice: Subject to any disclaimer, the term of this patent is extended or adjusted under 35 U.S.C. 154(b) by 0 days.

This patent is subject to a terminal disclaimer.

(21) Appl. No.: 14/709,859
(22) Filed: May 12, 2015

Related U.S. Application Data (63) Continuation of application No. 14/011,551, filed on Aug. 27, 2013, now Pat. No. 9,027,805.
(60) Provisional application No. 61/693,710, filed on Aug. 27, 2012, provisional application No. 61/847,404, filed on Jul. 17, 2013.

(51) Int. Cl.
*B62D 43/04* (2006.01)
*B62D 43/00* (2006.01)
(52) U.S. Cl.
CPC .............. *B62D 43/04* (2013.01); *B62D 43/002* (2013.01)
(58) Field of Classification Search
CPC ....... B62D 43/02; B62D 43/04; B62D 43/002
USPC ..................... 224/42.23, 42.24, 42.13, 42.21, 224/42.26–42.3
See application file for complete search history.

(56) References Cited

U.S. PATENT DOCUMENTS

| | | | | |
|---|---|---|---|---|
| 4,174,797 A | * | 11/1979 | Yasue et al. | 224/42.21 |
| 4,386,722 A | * | 6/1983 | Gearhart | 224/42.23 |
| 4,573,855 A | * | 3/1986 | Braswell | 414/463 |
| 4,765,164 A | * | 8/1988 | Prince, Jr. | 70/259 |
| 4,964,552 A | * | 10/1990 | Terwilliger | 224/42.23 |
| 5,275,028 A | * | 1/1994 | Giarrante | 70/56 |
| 5,755,365 A | * | 5/1998 | Rentfrow et al. | 224/42.23 |
| 2012/0018475 A1 | * | 1/2012 | Cooper | 224/401 |

* cited by examiner

*Primary Examiner* — Corey Skurdal
(74) *Attorney, Agent, or Firm* — Paula Estrada de Martin; Baker Donelson (57) ABSTRACT

A spare tire carrier for use with a truck, comprising a frame attachable underneath a truck, the frame having arms and a flat bar sized and shaped to hold a tire and a frame plate holding the frame to the truck, a rod attached in between the arms, the rod having a pole that rotates on the rod from a resting position to an upright position, wherein in the upright position the pole can hold a tire, a locking mechanism having a swing arm and a lock, the swing arm attached to the frame plate and is removably connected to the top of the pole, wherein the swing arm and pole are locked together with a lock.

6 Claims, 6 Drawing Sheets

SPARE TIRE CARRIER FOR TRUCK

CROSS-REFERENCE TO RELATED APPLICATIONS

This is a non provisional patent application of U.S. Provisional Patent Application Ser. No. 61/693,710, filed 27 Aug. 2012, and U.S. Provisional Patent Application Ser. No. 61/847,404, filed 17 Jul. 2013.

Priority of U.S. Provisional Patent Application Ser. No. 61/693,710, filed 27 Aug. 2012, and U.S. Provisional Patent Application Ser. No. 61/847,404, filed 17 Jul. 2013, each of which is hereby incorporated herein by reference, is hereby claimed.

STATEMENT REGARDING FEDERALLY SPONSORED RESEARCH OR DEVELOPMENT

Not applicable

REFERENCE TO A "MICROFICHE APPENDIX"

Not applicable

BACKGROUND OF THE INVENTION

1. Field of the Invention

The apparatus of the present invention relates generally to spare tire carriers for use with trucks. More particularly, the present invention relates to a spare tire frame that attaches underneath trucks, such as for example utility trucks or G-series trucks.

2. General Background of the Invention

Spare tires are typically carried on a truck bed, rear frame, or below the tailgate of a truck. When cargo is carried in a truck, there is often no room for a spare tire. Also, for trucks such a G-series trucks, a spare tire carrier cannot be secured under the tailgate of the truck. Spare tires are often removed from a truck if there is no room for it, leaving a driver and his cargo on the side of the road with a flat tire and no spare tire to fix it. It is desirable to carry a spare tire underneath a truck so that there is more space in the truck and it is easily accessible if needed.

It is also desirable to securely fasten a spare tire to a truck to prevent theft of the tire and to stop/prevent the tire from falling off of the truck during transit. In the past, tires have been secured using a rope, cable, lock bar, and/or padlock. These securing mechanisms are not protected and can easily be cut and removed, allowing the tire to be stolen.

The following possibly relevant US Patents are incorporated herein by reference:

TABLE

| PAT/PUB. NO. | DESCRIPTION | ISSUE/PUB DATE |
| --- | --- | --- |
| 3,613,972 | Spare Tire Bracket Apparatus | Oct. 19, 1971 |
| 3,904,093 | Spare Tire Carrier | Sep. 9, 1975 |
| 4,228,936 | Tire and Tool Carrier | Oct. 21, 1980 |
| 4,278,191 | Spare Tire Carrier | Jul. 14, 1981 |
| 4,312,620 | Spare Tire Rack | Jan. 26, 1982 |
| 4,386,722 | Vehicle Spare Tire Holder | Jun. 7, 1983 |
| 4,428,513 | Spare Wheel Carrier | Jan. 31, 1984 |
| 4,573,855 | Swingable Tire Carrier | Mar. 4, 1986 |
| 4,805,817 | Helterbrand | Feb. 21, 1989 |
| 5,638,710 | Method for Securing a Spare Tire | Jun. 17, 1997 |
| 5,755,365 | Spare Tire Carrier for Towable Trailers | May 26, 1998 |
| 6,142,449 | Apparatus Suitable for Securing an Article under a Vehicle | Nov. 7, 2000 |
| 6,499,724 | Safety Latch Fora Tire Carrier | Dec. 31, 2002 |
| 6,749,094 | Lug Wrench and Spare Tire Locking Assembly | Jun. 15, 2004 |
| 6,969,087 | Semi-tractor Tire Rack Apparatus | Nov. 29, 2005 |

BRIEF SUMMARY OF THE INVENTION

The apparatus of the present invention includes a spare tire carrier for use with a truck, comprising a frame attachable underneath a truck, said frame having arms and a flat bar sized and shaped to hold a tire and a frame plate holding the frame to the truck, a rod attached in between said arms, the rod having a pole that rotates on the rod from a resting position to an upright position, wherein in the upright position the pole can hold a tire, and a locking mechanism having a swing arm and a lock, the swing arm attached to said frame plate and is removably connected to the top of the pole, wherein the swing arm and pole are locked together with a lock.

Preferably, the lock is covered with a cover box.

Preferably, the present invention further comprises a cone attached to the pole and screwed down onto the pole to tightly fit in the hub of the tire.

Preferably, the present invention further comprises braces attaching the flat bar of the frame to the truck.

Preferably, the cover box fully conceals the lock and connection between the swing arm and pole.

Preferably, the swing arm is attached to the frame plate in a pipe with teflon bushing.

Preferably, the swing arm can pivot off of the pole to remove the tire from the frame.

Preferably, the frame plate is L-shaped having a vertical portion and a horizontal portion.

Preferably, the flat bar is approximately 30-40 inches long, the arms are approximately 25-35 inches long, the vertical section of the frame plate is approximately 5-15 inches long, and the horizontal portion of the frame plate is approximately 2-10 inches long.

Preferably, the swing arm can be removed and replaced.

Preferably, the pipe is approximately 2-6 inches long and approximately 0.25-1.00 inch wide.

Preferably, the swing arm is approximately 0.25-0.50 inch thick and L-shaped having a lower, vertical section that is approximately 5-10 inches long, and an upper, horizontal section that is approximately 15-20 inches long.

Preferably, the pole is approximately 15-20 inches long and approximately 1-2 inches thick.

Preferably, the cone has a diameter of approximately 6-10 inches and a height of approximately 6-10 inches.

Preferably, the braces are L-shaped having a vertical brace portion and a horizontal brace portion.

Preferably, the vertical brace portion is approximately 15-18 inches long, and the horizontal brace portion is approximately 6-9 inches long.

BRIEF DESCRIPTION OF THE DRAWINGS

For a further understanding of the nature, objects, and advantages of the present invention, reference should be had to the following detailed description, read in conjunction with the following drawings, wherein like reference numerals denote like elements and wherein.

DETAILED DESCRIPTION OF THE INVENTION

A preferred embodiment of the apparatus of the present invention is seen in FIGS. 1-11. The present invention includes a frame 10 attached to a vehicle 40, such as a G-series truck, to hold a spare tire 18 for the vehicle. The frame 10 is preferably large enough to carry a spare tire for a large vehicle. Preferably, the frame 10 is attached underneath the truck 40 and connected to the truck frame beams 41. Frame 10 includes a locking mechanism that secures a spare tire to the frame to prevent the tire from being stolen or lost.

Frame 10 includes frame plate 14, arms 11, and flat bar 12 for holding the tire 18 on the frame. Preferably the frame 10 has two arms 11 connected to and extending from frame plate 14. A flat bar 12 is connected in between each arm 11 and attached to the end portion 31 of each arm 11. The flat bar 12 and arms 11 can be attached together with bolts 44 through holes 65 in arm 11 and holes 50 in bar 12.

Frame plate 14 can be L-shaped, having a vertical section 32 and a horizontal section 33. The vertical section 32 can be connected to the truck frame 41 to hold the frame 10 to the truck 40 with bolts 44 that are placed through holes 46. Arms 11 are attached to the horizontal section 33. The arms 11 can be connected to the horizontal section 33 with bolts 44 through holes 47.

Figure 11:
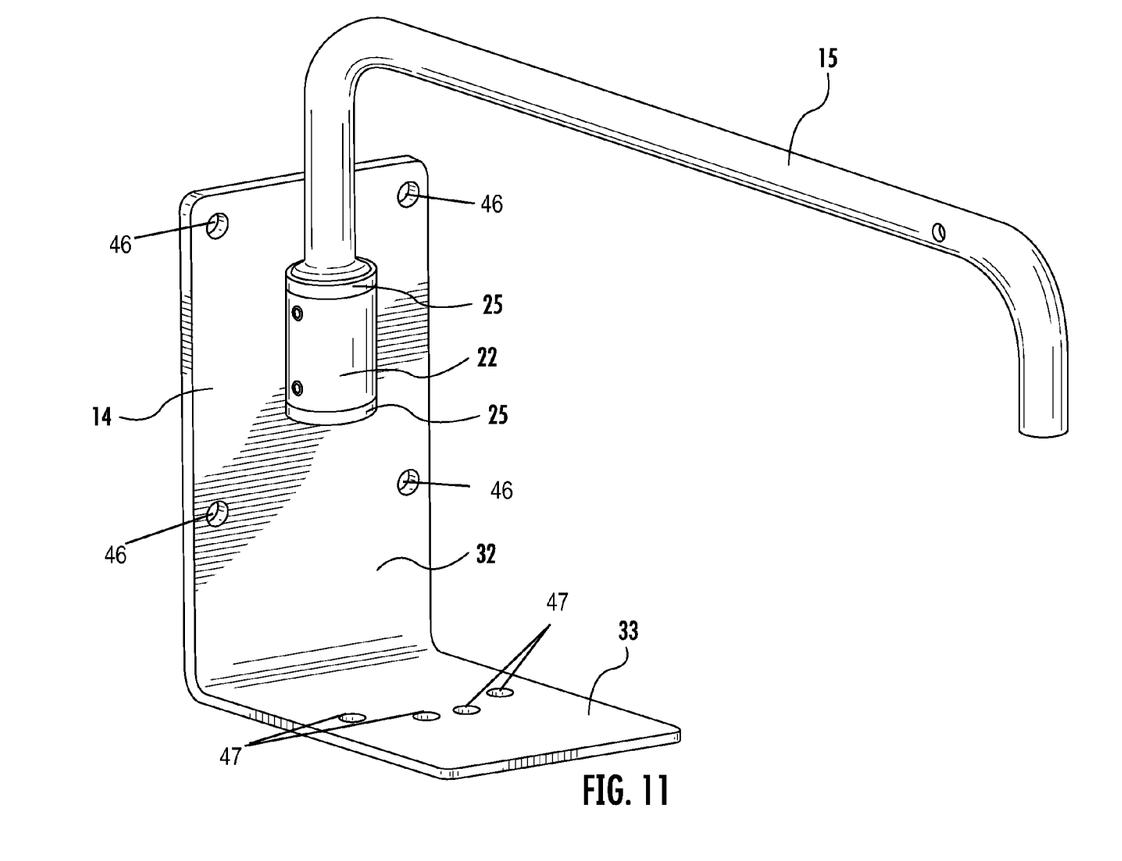
FIG. 11 shows a view of a back plate with a locking bar attached.

The apparatus of the present invention includes a locking mechanism to hold the tire 18 to the frame 10. The locking mechanism includes a swing arm 15, an adjustment leg 20 and a pole 19. Swing arm 15 is connected to vertical section 32 of frame plate 14. Swing arm 15 can be a round bar that is molded into an L shape. The lower end 34 of swing arm 15 is connected to vertical section 32 by a pipe with teflon or plastic bearing/bushing 22. A flat washer 25 can be attached, such as tack weld, above the teflon bearing 22 to prevent vertical movement of the swing arm 15. A flat washer 25 can be attached below the teflon bearing 22 to prevent vertical movement of the swing arm 15. The pipe 22 with teflon or plastic bearing can be about 3 inches long and about ⅝ inches wide. The lower end 34 of swing arm 15 can be connected to horizontal part 33 of frame plate 14 by a wheel lock nut 36 with a lug bolt. Optionally, the lower end 34 of swing arm 15 ends at the connection to bearing 22, as seen in FIG. 11.

Preferably, a Ford keyed lug nut is used to allow a user to remove an existing swing arm and replace it with a new swing arm 15. Swing arm 15 can be about ⅜" thick. The lower end 34 of swing arm can be 7 inches long and the upper end 35 can be 17 inches long. A conduit pipe 13 is attached to the end of swing arm 15 (see FIGS. 5, 10). Conduit pipe 13 can be attached by welding to the swing arm 15. The conduit pipe 13 can be 2" thick. The conduit pipe 13 has a hole 17 on the front of the pipe 13 to allow for a lock pin 16 to be inserted into pipe 13.

Figure 5:
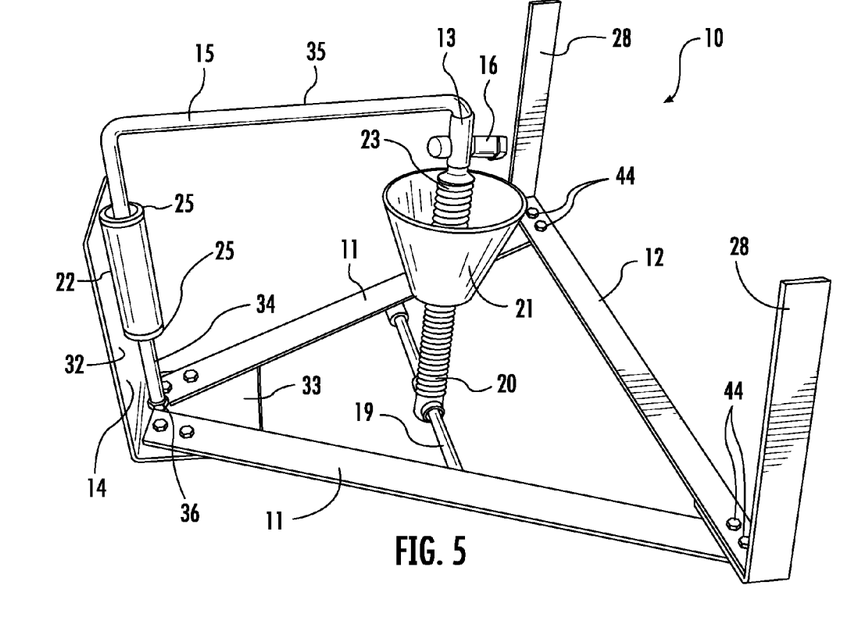
FIG. 5 shows a side perspective view of a preferred embodiment of the apparatus of the present invention.

Pole 19 can be attached in between the arms 11 as seen in FIG. 5. Adjustment leg 20 is attached to pole 19 and located near the center of the frame 10. The adjustment leg 20 can have a hole in which the round bar 19 can be fit through to hold adjustment leg 20 to arms 11 of frame 10. Adjustment bar 20 can rotate on pole 19 from a resting position (see FIG. 1) to an upright position (see FIG. 5).

In one an alternate embodiment (not shown in figures), a small round bar 38 can be connected to the top of adjustment leg 20 and has a hole 39 at the top of the small bar 38 for a lock 115 to fit through. The hole 39 can be 5/16 inch thick. The round bar 38 can be ¾ inch thick and 4 inches long, with ¾ inch of the bar 38 extending out of adjustment leg 20. The adjustment leg 20 and bar 38 can extend 15½ inches above pole 19. Adjustment leg 20 can be 1½ inches thick.

Hole 17 in conduit pipe 13 lines up with hole 39 in the bar 38 of adjustment leg 20. A lock pin 16 can be insert in these holes 17, 39 to lock the adjustment bar 20 to the swing arm 15. Optionally, a cover box 24 can be attached to adjustment leg 20 and used to securely cover the conduit pipe 13 and locking mechanism. It is buyer's choice if he wants to cover the lock or not. The locking mechanism can be accessed by lifting the cover box 24. When the cover box 24 is in a closed position (see FIG. 7) it fully conceals the lock pin 16. Swing arm 15 has a stop 37 that prevents the cover box 24 from damaging the swing arm 15 when the cover box 24 is lifted and released. Cover box 24 is attached to adjustment bar 20 with a sleeve 26 and pin 29 that act as a hinge on which the cover box 24 swings from a closed position to a lifted position (see FIG. 9). Cover box 24 can have a round bar 42 attached along the bottom edge to prevent a user from cutting his hand during use.

Cone 21 can be attached to the top of adjustment leg 20 by screwing cone 21 on a threaded section 23 of adjustment leg 20. The cone 21 can have a diameter of 8 inches, and a height of 8 inches. The top of the cone 21 has a round bar 43 attached to it so that there is no sharp edge at the top of cone 21. The round bar 43 prevents a user from cutting their hand on a sharp edge of cone 21. The round bar 43 can be ¼" thick. The cone 21 is screwed down on the adjustment leg 20 so that it fits in the hub of a tire 18 and is in a position that can lock the wheel 18 onto the frame 10.

Frame plate 14 can be attach to the underside of truck frame/beams 41 in order to hold the apparatus 10 to the vehicle 40. The frame 10 can also be attached to the truck frame/beams 41 with braces 28. Braces 28 attach to flat bar 12 and are preferably L-shaped, having a vertical portion 48 and a horizontal portion 49. The vertical portion 48 can have holes 50 for attaching to truck frame 41 with clamps 45 or bolts 44. The horizontal portion 49 can have holes 51 for attaching to flat bar 12 and arm 11 with bolts 44 through holes 55, 60. Preferably a brace 28 can be attached on each side of the frame 10 (see FIGS. 5-7), and attached to flat bar 12 at the connection intersection 30 of flat bar 12 to arm 11. Brace 28 slides underneath flat bar 12 to hold the flat bar 12 to the truck frame 41. The braces 28 can be 2 inches wide, the brace vertical section can be 16½ inches long, and the brace horizontal section can be 7⅞ inches long.

Figure 6:
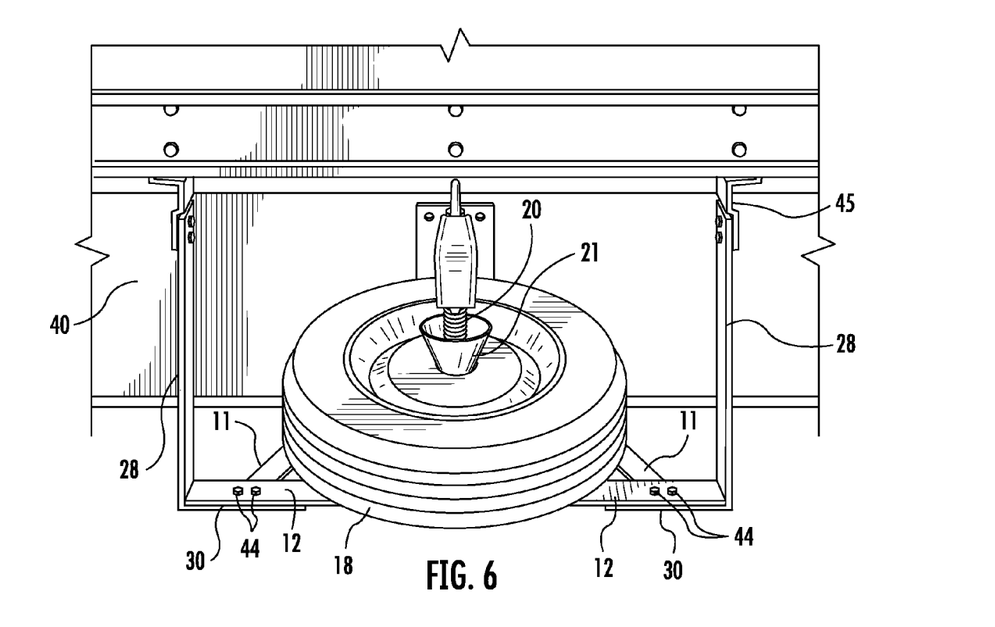
FIG. 6 shows a front view of a preferred embodiment of the apparatus of the present invention with a tire and attached to a truck frame.
Figure 7:
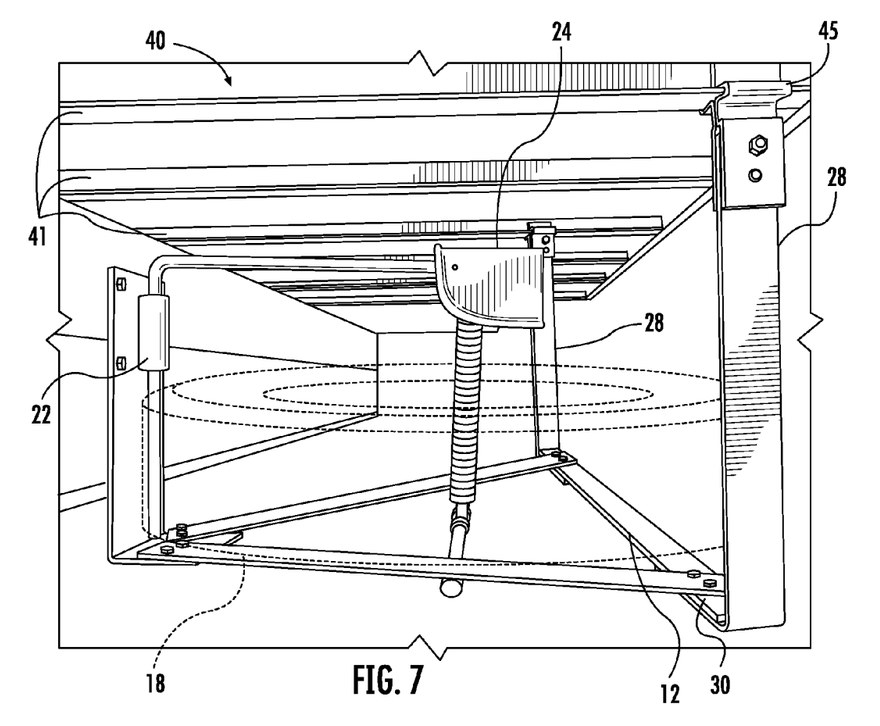
FIG. 7 shows a side view of a preferred embodiment of the apparatus of the present invention attached to a truck frame with a tire in dashed lines.
Figure 8:
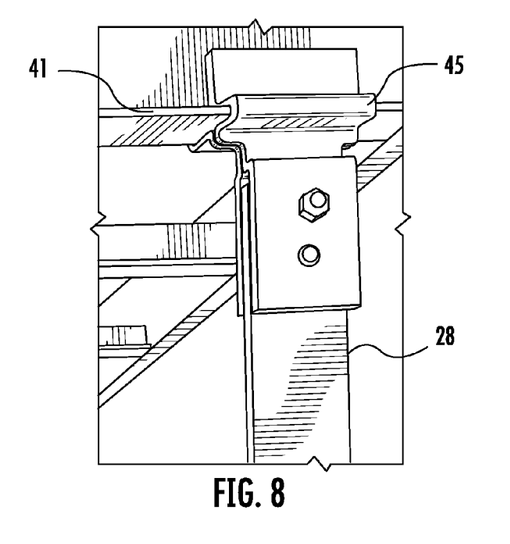
FIG. 8 shows a fragmentary view of clamps attaching the apparatus to a truck frame.
Figure 9:
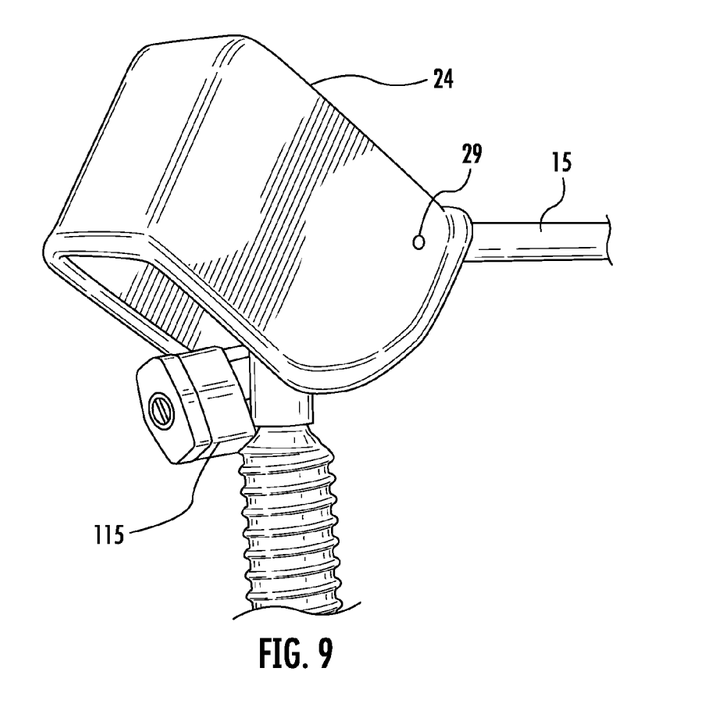
FIG. 9 shows a view of a lock box lifted and showing a lock connected to a locking bar and a rod.
Figure 10:
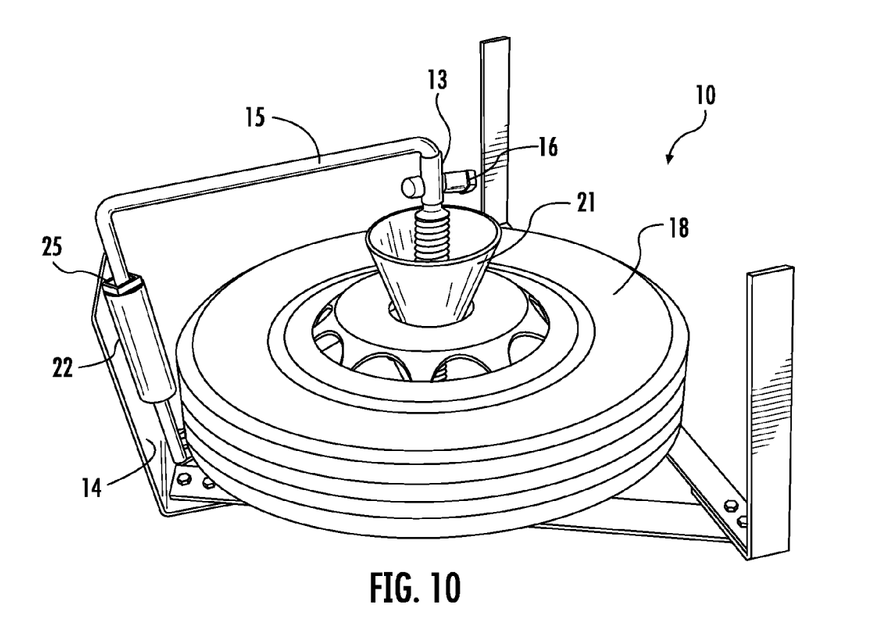
FIG. 10 shows a view of a rod and a locking bar connected with a lock attached and a cone on the rod secured to a tire.

The braces 28 can be secured to the truck frame 41 with clamps 45 that attach the braces 28 to the truck bed frame 41, securing the tire frame 10 to the vehicle 40. Different type of clamps 45 are required for different types of truck frames, such as truck frames with L-shaped beams, truck frame with I-shaped beams, and truck frames with square tubing beams. FIGS. 6-8 show some of the different clamps 45 that can be used with the apparatus of the present invention.

The dimensions of the present invention can be larger or smaller depending on the size of the tire to be stored. For example, a support frame for a 28" tire can have holes 47 that are about ½", the bolts 44 can be about 1¼" long with lock nuts (not shown). In this embodiment, the horizontal section 33 of frame plate 14 is shorter (about 2" instead of about 3"). A tire support 10 for a larger tire 18, such as a 32" tire would preferably have a longer horizontal section 33 of frame plate 14 for the bigger tire 18.

In an alternate embodiment, a flat washer 119 (about ⅛"× ¾") can be used with the swing arm 15 to prevent movement of the swing arm 15. In another embodiment, a frame/backing plate 14 has holes 46 that are oblong vertical, about 13/32"× 13/16". All holes 46, 47 can be made oblong, about 13/32"×13/16", on horizontal section 33 of the frame/backing plate 14.

In another embodiment, the braces 28 have holes 51 that are oblong-shaped holes (about 13/32"×13/16") on the horizontal portion 49 of braces 28. The holes 50 on the vertical portion 48 of braces 28 are still about ⅜".

Figure 1:
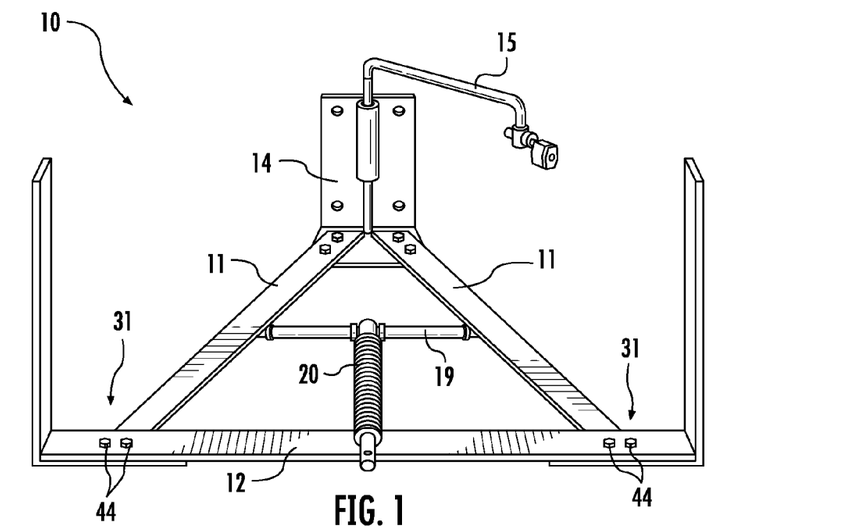
FIG. 1 shows a front perspective view of a preferred embodiment of the apparatus of the present invention.
Figure 2:
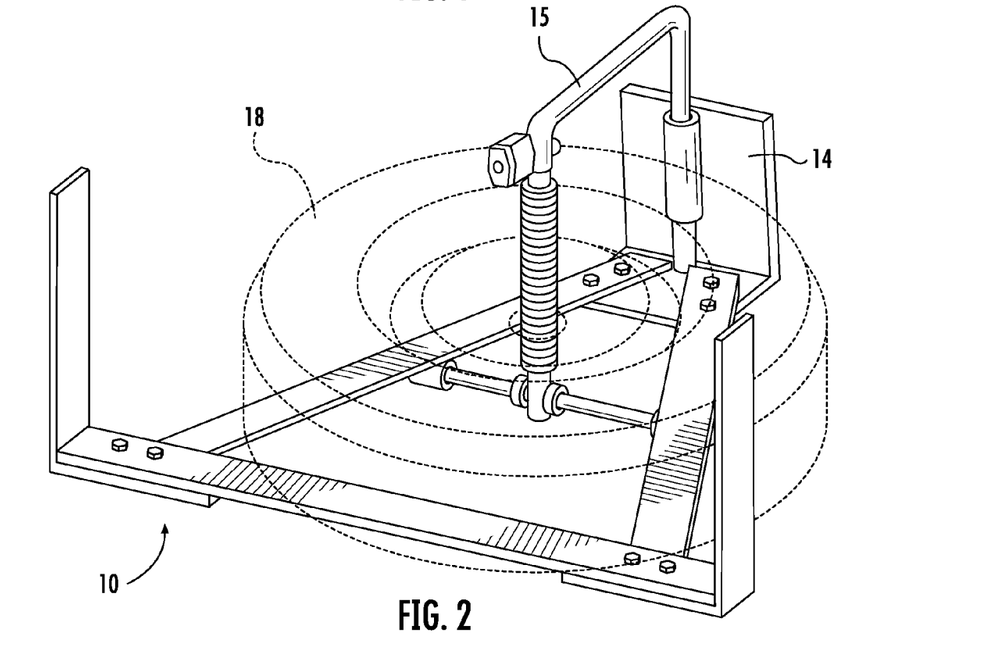
FIG. 2 shows a perspective view of a preferred embodiment of the apparatus of the present invention with a tire in dashed lines.
Figure 3:
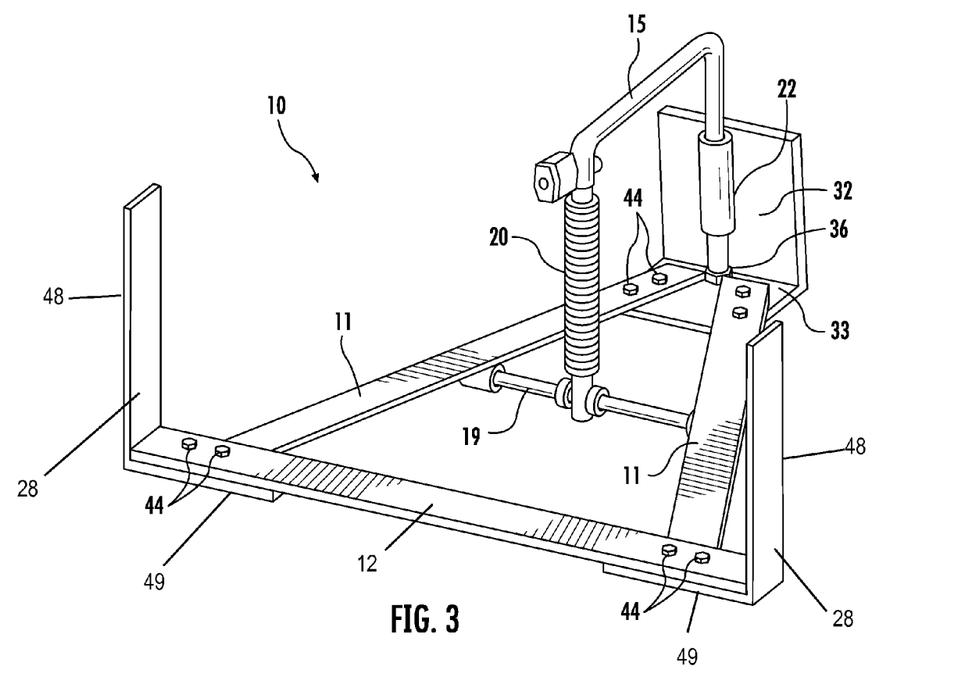
FIG. 3 shows a perspective view of a preferred embodiment of the apparatus of the present invention.
Figure 4:
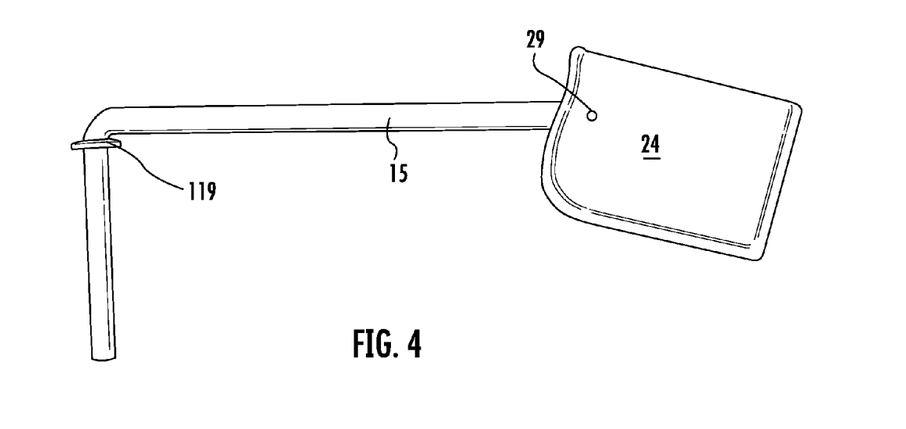
FIG. 4 shows a front view of a locking bar with a lock box attached.

In another embodiment, arms 11 can have holes 55 that are oblong-shaped about 13/32"×13/16". The swing arm 15 can optionally have a lock box 24. A washer 119 can be placed at the top and bottom of the swing arm 15 that is attached to the frame/backing plate 14 as seen in FIG. 4. The washers 119 can be about ⅛" thick×about ¾" hole×about 1½" width, and welded in place to secure swing arm 15 in place. The washer 119 can be welded to the tire frame 10.

In another embodiment (not shown), a lock box 24 sized to about 3", a nipple (about ¾") can be added for spacer and to keep the swing arm 15 (about ¾") in place to swivel in and out. A round bar stock (about ¼") can go through the lock box 107 and attached to the outside of the box. A spacer round bar (about ¾") with a hole (about ¼") can be made in the middle of the box for the swing arm 15.

In another embodiment, a flat backing plate 14 can be 7½" long and all the holes 46, 47 can be oblong, about 13/32"×13/16".

Instructions for Assembly:
(1) Find four WI beams (can also be L beams or C channels, depending on type of truck frame) on underside of truck frame 41.
(2) In the center of the middle two beams, place backing plate 14 on frame of truck 41. You may have to pre-drill holes for attachment to the truck frame 41.
(3) Attach braces 28 (loosely attached bolts 44 on clamps 45 on the two center beams of the truck frame 41). Optionally, backing plate 14 can be welded for permanent connection to truck frame (no clamps needed).
(4) Attach flat bar 12 in between braces 28.
(5) Attach arms 11 on top of flat bar 122, and on braces 28 and plate 14.
(6) Install threaded T-bar 20 on pole 19 between arms 11.
(7) Install swing arm 15 on plate 14, and on other side of threaded T-bar 20 for final connection.
(8) Tighten all bolts 44—using aviation lock nuts/bolts included in package (not shown).
(9) Put tire 18 on vertical portion of threaded T-bar 20.
(10) Place cone 21 on vertical portion of threaded T-bar 20, and screw cone 21 down threaded T-bar 20 until tight against the tire 18 (cone 21 is snugly secured in rim of tire 18).
(11) Tire 18 is now sitting on top of threaded T-bar 20, arms 11 and flat bar 12 (see FIG. 6).
(12) Swing arm 15 (with or without lock box) is then connected to threaded T-bar 20.
(13) Swing arm 15 can be lifted off of threaded T-bar 20 and swing away so that the user can unscrew cone 21 to remove tire 18.
(14) When swing arm 15 is in place on threaded T-bar 20, a slide pad lock 115 is inserted into holes in swing arm 15 and T-bar 120 to lock tire 18 in place on tire frame 10.
(15) Swing arm 15 has the option of a lock box 24 to further secure and lock tire 18.

Clamps 45 are truck-specific. Swing arm 15 can be already connected to plate 14 in package as sold. After everything is tightened down, a hole can be drilled into the clamp 45 of about 7/16" in H beam to secure the tire frame 10 to the truck frame 41. Securing the swing arm 15 keeps it from sliding and damaging truck frame 41. Braces 28 need separate holes to secure to body of the truck 40. Clamp gaps can be a little bigger for different size frames. A hole (not shown) is preferably added in the side of cone 21 to allow water, road grime, etc to escape and not get trapped in cone 21 and threads 23.

PARTS LIST

The following is a list of suitable parts and materials for the various elements of the preferred embodiment of the present invention.

| Parts Number | Description |
| --- | --- |
| 10 | tire frame |
| 11 | arm |
| 12 | flat bar |
| 13 | conduit pipe |
| 14 | frame plate |
| 15 | swing arm |
| 16 | lock pin |
| 17 | hole |
| 18 | tire |
| 19 | pole |
| 20 | adjustment leg |
| 21 | cone |
| 22 | pipe |
| 23 | threaded section |
| 24 | cover box |
| 25 | washer |
| 26 | sleeve |
| 27 | angle |
| 28 | brace |
| 29 | pin |
| 30 | connection intersection |
| 31 | arm end portion |
| 32 | vertical section |
| 33 | horizontal section |
| 34 | lower arm section |
| 35 | upper arm section |
| 36 | wheel lock nut |
| 37 | stop |
| 38 | small round bar |
| 39 | hole |
| 40 | truck/vehicle |
| 41 | truck frame |
| 42 | round bar |
| 43 | round bar |
| 44 | bolt |
| 45 | clamps |
| 46 | hole |
| 47 | hole |

-continued

| Parts Number | Description |
|---|---|
| 48 | vertical portion of L-shaped brace |
| 49 | horizontal portion of L-shaped brace |
| 50 | hole |
| 51 | hole |
| 55 | hole |
| 60 | hole |
| 115 | lock |

All measurements disclosed herein are at standard temperature and pressure, at sea level on Earth, unless indicated otherwise. All materials used or intended to be used in a human being are biocompatible, unless indicated otherwise.

The foregoing embodiments are presented by way of example only; the scope of the present invention is to be limited only by the following claims.

The invention claimed is:

1. A spare tire carrier for use with a truck, wherein the truck has a truck frame and wherein the tire has a hub, the carrier comprising:
   a) a frame attachable underneath a truck, said frame having arms and a flat bar sized and shaped to hold a tire and a frame plate holding the frame to the truck;
   b) a rod attached in between said arms, the rod having a pole that rotates on the rod from a resting position to an upright position, wherein in the upright position the pole can hold a tire;
   c) a locking mechanism having a swing arm and a lock, the swing arm attached to said frame plate and removably connected to a top section of the pole, wherein the swing arm and pole are locked together with a lock; and
   d) a cone attached to the pole, wherein the cone is capable of being screwed down onto the pole to tightly fit in the hub of a tire rim.

2. The spare tire carrier of claim 1, wherein the lock is covered with a cover box.

3. The spare tire carrier of claim 1, further comprising braces attaching the flat bar of the frame to the frame of the truck.

4. The spare tire carrier of claim 2, wherein the cover box fully conceals the lock and connection between the swing arm and pole.

5. The spare tire carrier of claim 1, wherein the swing arm is attached to the frame plate in a pipe with teflon bushing or plastic bushing.

6. The spare tire carrier of claim 1, wherein the swing arm can pivot off of the pole to remove the tire from the frame.

* * * * *